United States Patent
Zhong

(10) Patent No.: US 8,347,299 B2
(45) Date of Patent: Jan. 1, 2013

(54) ASSOCIATION AND SCHEDULING OF JOBS USING JOB CLASSES AND RESOURCE SUBSETS

(75) Inventor: Enci Zhong, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1227 days.

(21) Appl. No.: 11/875,221

(22) Filed: Oct. 19, 2007

(65) Prior Publication Data
US 2009/0106763 A1 Apr. 23, 2009

(51) Int. Cl.
G06F 9/50 (2006.01)

(52) U.S. Cl. .......................................... 718/104
(58) Field of Classification Search .................... 718/104
See application file for complete search history.

(56) References Cited

U.S. PATENT DOCUMENTS

| | | | | |
|---|---|---|---|---|
| 6,523,120 B1* | 2/2003 | Strasnick | | 726/4 |
| 2003/0014510 A1* | 1/2003 | Avvari et al. | | 709/223 |
| 2004/0015976 A1* | 1/2004 | Lam | | 718/104 |
| 2005/0015504 A1* | 1/2005 | Dorne et al. | | 709/229 |
| 2005/0081208 A1* | 4/2005 | Gargya et al. | | 718/100 |
| 2005/0259581 A1* | 11/2005 | Murray et al. | | 370/232 |
| 2006/0048157 A1* | 3/2006 | Dawson et al. | | 718/104 |
| 2006/0130034 A1* | 6/2006 | Beisiegel et al. | | 717/166 |
| 2006/0230405 A1* | 10/2006 | Fraenkel et al. | | 718/104 |
| 2007/0022425 A1* | 1/2007 | Jackson | | 718/104 |

OTHER PUBLICATIONS

Tivoli Workload Scheduler LoadLeveler Using and Administering, Version 3 Release 4.*

* cited by examiner

Primary Examiner — Thomas Lee
Assistant Examiner — Benjamin Wu
(74) Attorney, Agent, or Firm — Jon A. Gibbons; Thomas Grzesik; Fleit Gibbons Gutman Bongini & Bianco PL

(57) ABSTRACT

A method, information processing system, and computer program storage product for associating jobs with resource subsets in a job scheduler. At least one job class that defines characteristics associated with a type of job is received. A list of resource identifiers for a set of resources associated with the job class is received. A set of resources available on at least one information processing system is received. The resource identifiers are compared with each resource in the set of resources available on the information processing system. A job associated with the job class with is scheduled with a set of resources determined to be usable by the job based on the comparing.

14 Claims, 5 Drawing Sheets

ASSOCIATION AND SCHEDULING OF JOBS USING JOB CLASSES AND RESOURCE SUBSETS

FIELD OF THE INVENTION

The present invention generally relates to the field of job scheduling in a computing environment, and more particularly relates to grouping resources into subsets and associating jobs with the resource subsets.

BACKGROUND OF THE INVENTION

A job scheduler is often used in single system or distributed computing environments to schedule jobs to run using the resources of the computing environment. A simple way to schedule jobs is to let all jobs share all of the computing resources. However, sometimes there is a need to let different sets of jobs use different subsets of the resources. A common way to group jobs is to divide jobs into job classes. An existing way to let jobs in each job class to use a different subset of the computing resources is to specify for each computing resource a list of job classes whose jobs are allowed to use the resource.

For example, in a distributed cluster, one can specify that machine 1 allows job class A and B and machine 2 allows job class B and C, etc. For a more detailed discussion of implementing job class lists and their allowed resources see "Tivoli Workload Scheduler LoadLeveler Using and Administering", Version 3 Release 4, which is hereby incorporated by reference in its entirety. The above job scheduling method works fine when the number of resource identities, for example machines in a distributed cluster, is relatively small. However, when there are numerous resource identities in a computing system, the above method becomes difficult to use because it is cumbersome to make so many entries in so many different places.

Therefore a need exists to overcome the problems with the prior art as discussed above.

SUMMARY OF THE INVENTION

Briefly disclosed is a method for associating jobs with resource subsets in a job scheduler. The method includes receiving at least one job class that defines the characteristics associated with a type of job. A list of resource identifiers for a set of resources associated with the job class is received. A set of resources available on at least one information processing system is received. The resource identifiers are compared with each resource in the set of resources available on the information processing system. A job associated with the job class with is scheduled with a set of resources determined to be usable by the job based on the comparing.

In another embodiment, an information processing system for associating jobs with resource subsets in a job scheduler is disclosed. The information processing system includes a memory and a processor that is communicatively coupled to the memory. The information processing system also includes a job scheduler that is communicatively coupled to the memory and the processor. The job scheduler is adapted to receive at least one job class that defines the characteristics associated with a type of job. A list of resource identifiers for a set of resources associated with the job class is received. A set of resources available on at least one information processing system is received. The resource identifiers are compared with each resource in the set of resources available on the information processing system. A job associated with the job class with is scheduled with a set of resources determined to be usable by the job based on the comparing.

In yet another embodiment, a computer program storage product for associating jobs with resource subsets in a job scheduler is disclosed. The computer program storage product includes instructions for receiving at least one job class that defines the characteristics associated with a type of job. A list of resource identifiers for a set of resources associated with the job class is received. A set of resources available on at least one information processing system is received. The resource identifiers are compared with each resource in the set of resources available on the information processing system. A job associated with the job class with is scheduled with a set of resources determined to be usable by the job based on the comparing.

One advantage of the various embodiments of the present invention is that an efficient method and system for scheduling jobs in a computing environment is disclosed. A set of resource identities is specified for each job class that the job class can use. A group of resource identities can be represented by a single pattern. Generally, the number of job classes is much less than the number of resource identities in a computing environment. By specifying for each job class what resources can be used, the information is concentrated in a few places instead of spreading over many different places. Thus, it is much easier to enter and view the data. Also, allowing a group of resource identities to be represented by a single pattern saves time and effort when specifying the list of resource identities for each job class.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

EXAMPLE OF A COMPUTING ENVIRONMENT

Figure 1:
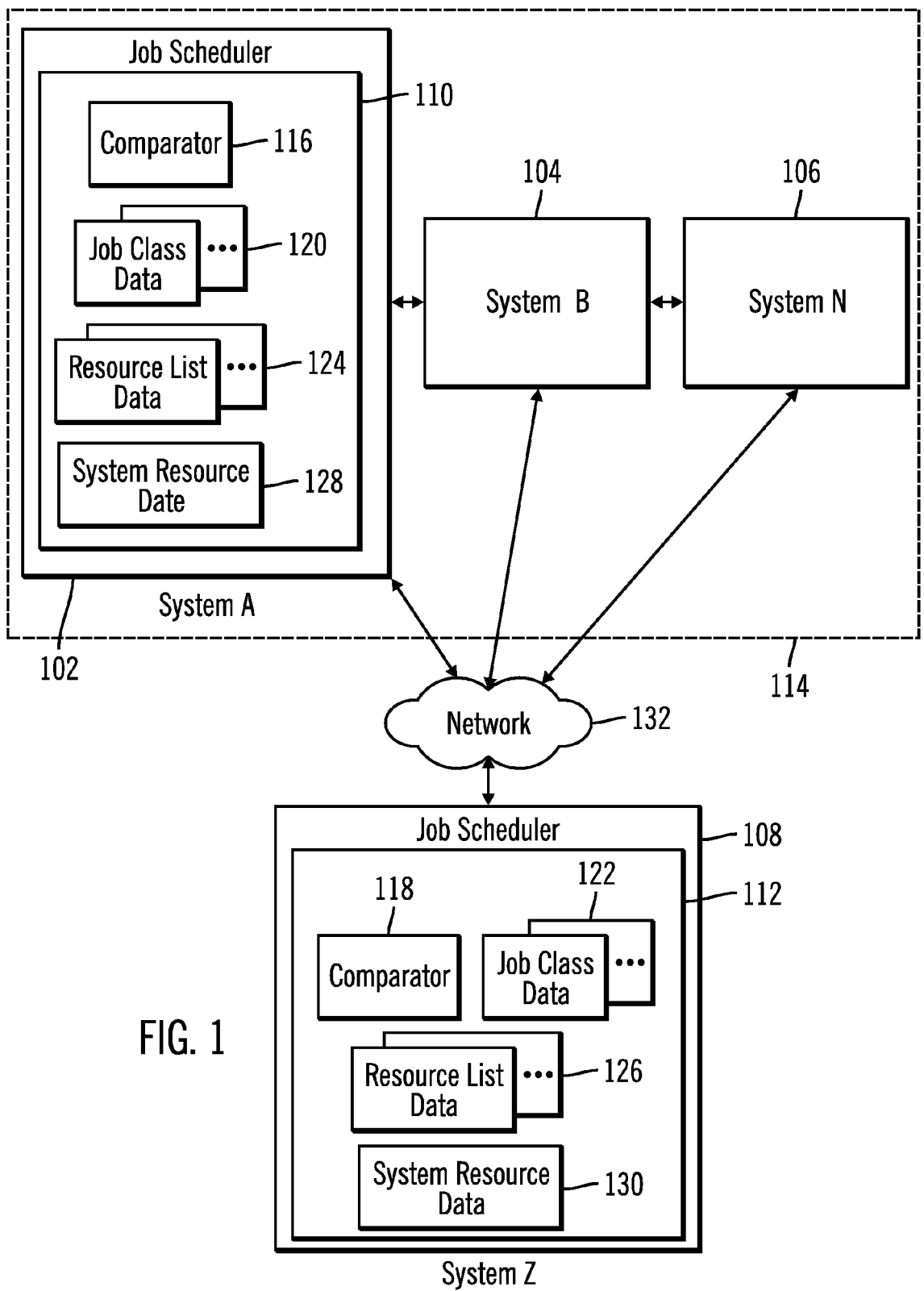
FIG. 1 is a block diagram illustrating an example of a computing environment, according to one embodiment of the present invention.

FIG. 1 is a block diagram illustrating an example of a computing environment according to one embodiment of the present invention. It should be noted that the present invention can be scaled across multiple processing nodes or can reside at a single node. FIG. 1 shows a plurality of information processing nodes 102, 104, 106, 108 (optionally) communicatively coupled to a network 132. In one embodiment, each information processing node is a stand alone system that is independent of the other nodes.

In this embodiment, each of the information processing nodes 102, 104, 106, 108 includes a job scheduler 110, 112. However, in another embodiment, the processing nodes 102, 104, 106 are part of a distributed processing environment 114 and one of the nodes such as System A 102 comprises the job scheduler 110 for scheduling jobs across each of the nodes 102, 104, 106. Alternatively, a remote information processing unit 18 can include a job scheduler 112 for scheduling jobs across the nodes 102, 104, 106.

The job scheduler 110, 112, in one embodiment, comprises a comparator 116, 118; job class data 120, 122; resource list data 124, 126, and system resource data 128, 130. The job class data 120, 122; resource list data 124, 26; and system resource data 128, 130 are used as inputs for the job scheduler 110, 112 for scheduling jobs according to the various embodiments of the present invention. Job class data 120, 122, in one embodiment, is created by and received from a user. A job class defines the characteristics associated with a type of job, such as the priority, run limits, and resources. Therefore, jobs comprises substantially similar characteristics are grouped together in a job class or are associated with a type of class.

In other words, the job class data 120, 122 can comprises a list of jobs associated with that particular job class or the job class data 120 can comprise the characteristics associated with a type of job. In this example, when a job is received at the scheduler 110, 112, the scheduler 110, 112 analyzes the job and the job class data 120, 122 to determine which job class the received job belongs to. A received job, in one embodiment, can explicitly state what job class it belongs to or can include characteristics that are compared to the job class data 120, 122 to identify the appropriate job class. Identifying the job class associated with a received job is important to determine the set of resources that can or cannot be used with the received job.

Figure 2:
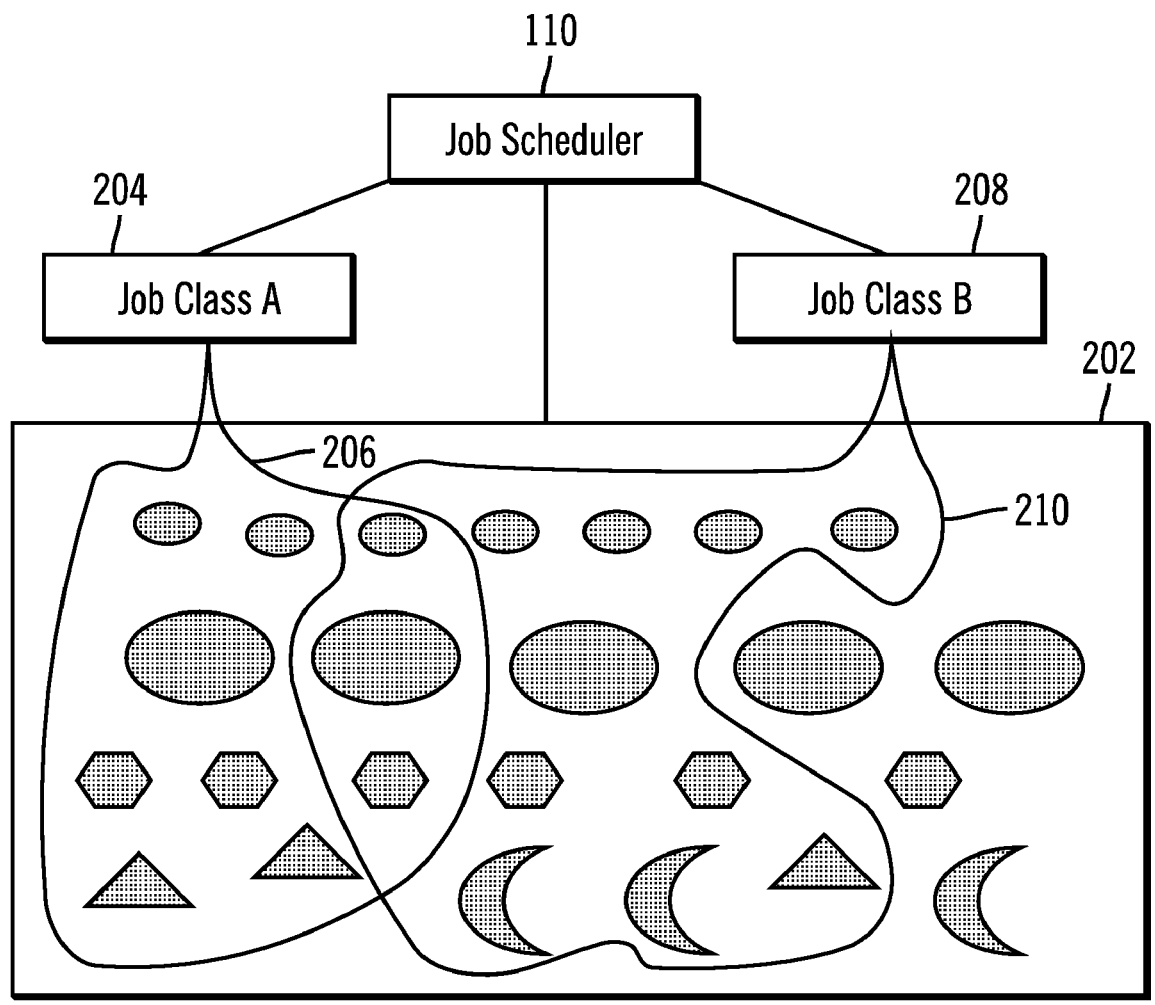
FIG. 2 is a block diagram illustrating an example of resource subsets being associated with different job classes according to one embodiment of the present invention.

For example, the resource list data 124, 126 comprises a set of resource lists associated with each job class type in the job class data 120, 122. Each resource list is a subset of all available resources at a node (or cluster of nodes if part of a distributed processing environment). FIG. 2 shows an example a subset of resources associated with a job class. FIG. 2 shows available resources 202 for a particular system. Job Class A 204 is associated with a first subset of resources 206 and Job Class B 208 is associated with a second subset of resources 210.

As can be seen, the subset of resources 206 and 210 can overlap. These subsets 206, 210 can indicate the resources that can be used by a job class or the resources that are not to be used by the job class. These subsets are used by the job scheduler 110 to appropriately schedule a job on a particular system. It should be noted that the resource list data 124, 126 can include both "can use" resource lists and "cannot use" resource list for each job class. If only a "can use" resource list is associated with a job class all other resources are not to be used by the job class. If only a "cannot use" resource list is associated with a job class, all other resources can be used by the job class. It should be noted that a resource list within the resource list data 124 can identify a subset of resources in a variety of ways. For example (but not limited to), the names of each resource can be included in the list, a portion of the names can be used, or a single pattern representing a set of resource identities can be used.

For example, consider a job scheduler for an IBM Blue Gene/P system where each job class is associated with a subset of base partitions. The Blue Gene/P system has 8 rows and each row has 4 racks and each rack has two base partitions. There are 64 base partitions in the system. The name of the base partition in the bottom of the first rack of the first row is R00-M0. The name of the base partition in the top of the first rack of the first row is R00-M1. The name of the base partition in the top of the last rack of last row is R73-M1, etc. A resource list, in this example, can indicate that Job Class A can use resource R00-M0, which is the exact name of a base partition R00-M00 in the system. In this example, Job Class A can only use the partition R00-M0. In another example, a resource list can specify that Job Class B cannot use resource R00-M0. Once again the exact name of the resource was specified. Since a "cannot use" list was given, Job Class B can use all other resources except resource R00-M0.

The use of a single pattern is beneficial because many computing resources are similarly named. A pattern can be specified which represents all resources in the computing system that match the pattern. The pattern can be a simple such as string that matches the beginning, middle, end, or any other part or combination of parts of a resource name. The pattern can also be complex implementing standard patterning rules or custom rules. An example of a pattern is as follows. In one example, a resource list for Job Class C specifies that Job Class C can use resource R0, where R0 is a pattern. R0 indicates the first row in a system and that Job Class C can only use all of the racks (totaling 4 in this example) of the first row, which has 8 partitions: R00-M0, R00-M1, R01-M0, R01-M1, R02-M0, R02-M1, R03-M0, R03-M1, R04-M0, and R01-M1. As can be seen, it is much simpler to specify R0 for the whole row instead of naming each of the 8 partitions.

In another example, a resource list for a Job Class D specifies that Job Class D can use R0 and another resource list (or the same list) specifies that Job Class D cannot use R00-M0. The "can use" list specifies the first row in the system. The "cannot use" list specifies one of the base partitions in the first row. Therefore, Job class D can use all base partitions on the first row except one of them, R00-M0. Thus, the following 7 base partitions can be used by job class D: R00-M1, R01-M0, R01-M1, R02-M0, R02-M1, R03-M0, R03-M1, R04-M0 and R04-M1. Again, it is much easier to specify R0 for the "can use" list and R00-M0 for the "cannot use" list than to specify every one of the 7 base partitions.

When the job scheduler 110, 112 receives a job, it schedules the job using the associated subset(s) of the available resources identified in the system resource data 128, 130. Once a job is received, the comparator 116, 118 identifies the job class associated with the job. This can be done, as discussed above, either from characteristics associated and comparing these characteristics to the job class data 120, 122 or by a class identifier associated with the job. The comparator 116, 118 then identifies the resource list in the resource list data 124 associated with the job class for the job.

As discussed above, there can be multiple resource lists associated with the job class and these resources lists can include "can use" and "cannot use" resource data. If both types ("can use" and "cannot use") of resource use data exist, the job scheduler 110, 112 can implement various rules to let one list override the other or let both lists work together. The comparator 116, 118 compares the identified resource lists against all available resources for the system. For example, if a pattern is used for a resource list, as discussed above, the comparator identifies if any of the available resources match that pattern. If they do, these are the resources available in the system that can be used to schedule (or not used if a "cannot use" list is being compared) the job. The job scheduler 116, 118 can check each resource against the lists specified for each job class directly or the information can be put into some kind of hash table for quick lookup. A more detailed discussion of scheduling a job based on its job class and associated resource list(s) is given with respect to the following operational flow diagrams.

EXAMPLE OF A PROCESS FOR SCHEDULING A JOB

Figure 3:
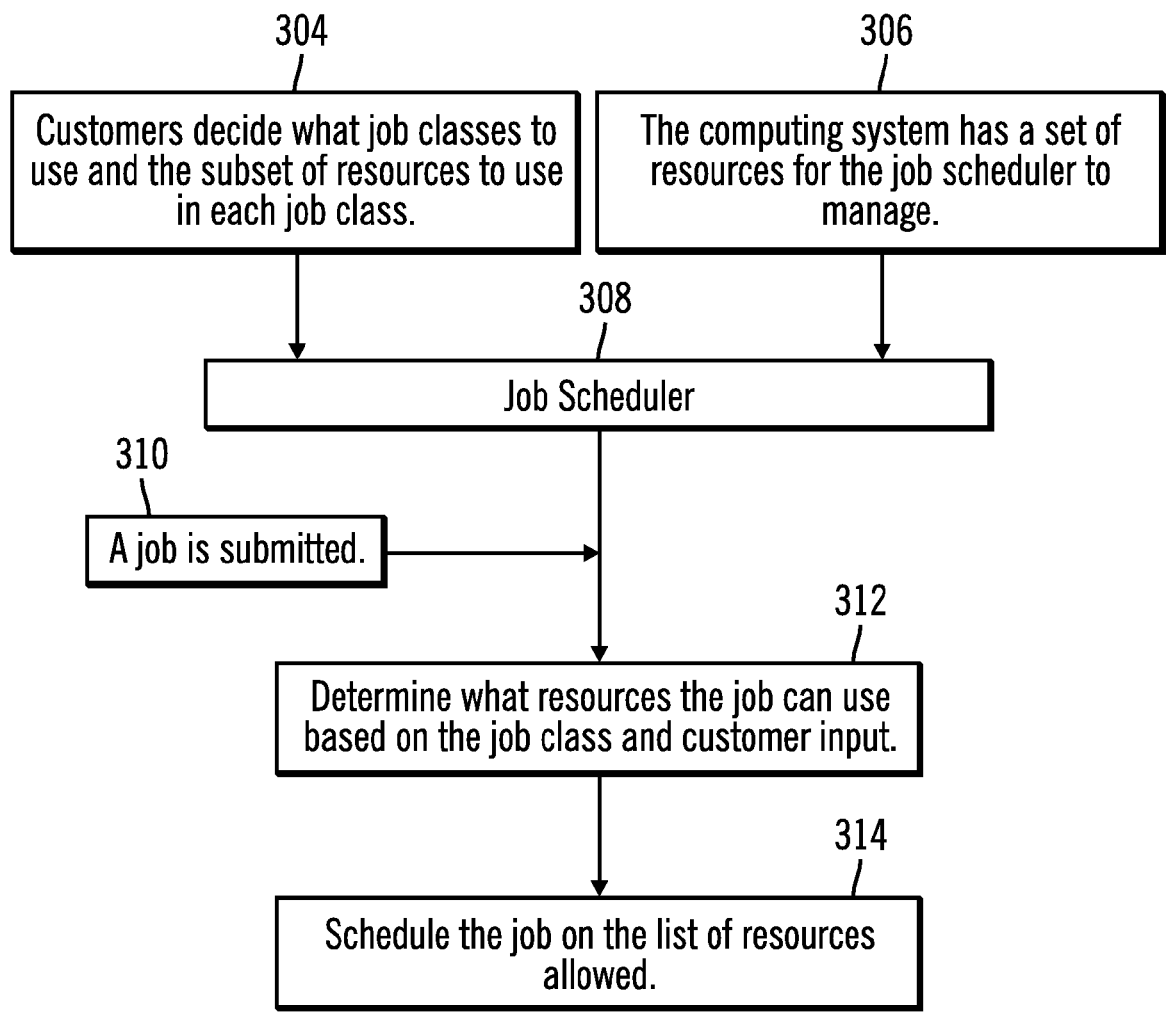
FIG. 3 is an operational flow diagram illustrating a process for scheduling a job with a subset of resources allowed for its job class type according to one embodiment of the present invention.

FIG. 3 is an operational flow diagram illustrating one example of a process for scheduling a job with a subset of resources allowed for its job class type. The operational flow diagram of FIG. 3 begins at step 302 and flows directly to step 304. Users, at step 304, determine a set of job class to use for scheduling a job and one or more subsets of available resources to be associated with each job class. As discussed above, these subsets can include "can use" and "cannot use" resource information. Available resources for the system (or computing environment), at step 306, are identified. The job scheduler 110, 112, at step 308, receive as inputs the job class data 120, resource list data 124, and system resource data 128. The job scheduler 110, at step 310, receives a job to schedule. The job scheduler 110, at step 312, determines the resources that the job can use based on the job class data 120 received from the user. This step is discussed in more detail with respect to FIG. 4. Once the resources that the job can use are identified, the job scheduler 110, at step 314, schedules the job on the list of resources allowed. The control flow then exits at step 316.

A MORE DETAILED PROCESS FOR DETERMINING RESOURCES TO BE USED FOR A JOB

Figure 4:
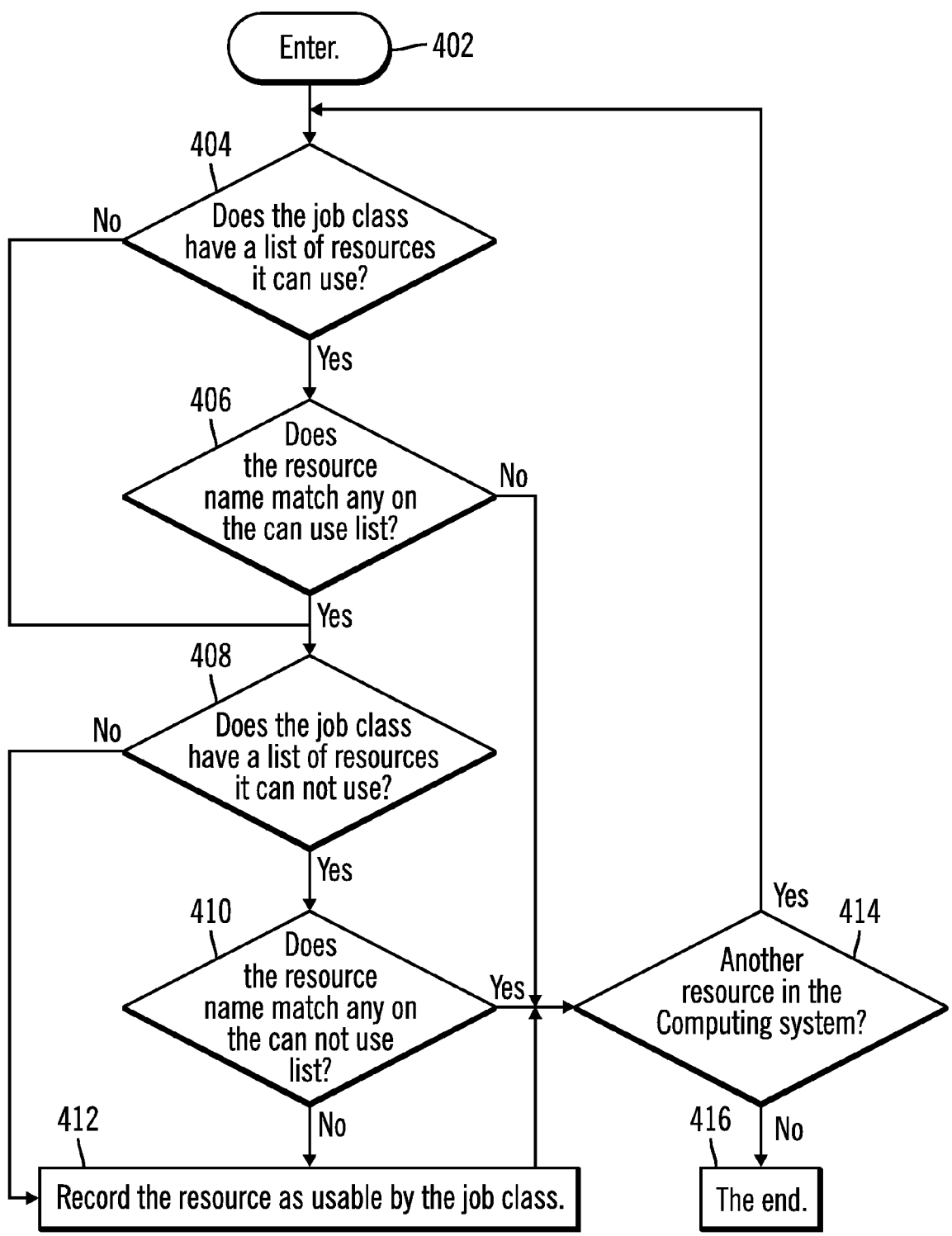
FIG. 4 is an operational flow diagram illustrating a process for determining resources that a job class can use according to one embodiment of the present invention.

FIG. 4 is an operational flow diagram illustrating a more detailed process of step 312 of FIG. 3. The operational flow diagram of FIG. 3 begins at step 402 and flows directly to step 404. The job scheduler 110, at step 404, determines if the job class associated with the received job has a list of resources that it can use. If the result of this determination is positive, the control flows to step 406. If the result of this determination is negative, the control flows to step 408.

The job scheduler 110, at step 406, compares each resource in the identified system resource data 128 to the resource identifier within the resource list associated with the job class to determine if the resources in the system match any of the resources identified by the resource list. As discussed above, the resource list can comprise a portion of a resource's name or a pattern that identifies similarly names resources. The job scheduler 110 compares the names of the resources in the system resource data 128 to the resource identifier (pattern, beginning of resource name, end of resource name, or any other part of the resource name) within the resource list. The job scheduler 110 can select different matching options such as (but not limited to) an exact match, case insensitive matching, match the beginning, end, or both portions of a resource name up to a given number of characters, match anywhere, and pattern matching rules. If the result of this determination is positive, the control flows to step 408. If the result of this determination is negative, the control flows to step 414.

The job scheduler 110, at step 408, determines if the job class is associated with a "cannot use" resource list, as discussed above. If the result of this determination is positive, the control flows to step 410. If the result of this determination is negative, the control flows to step 412. If the job class is associated with a "cannot use" resource list, the job scheduler 110, at step 410, determines if any of the resource names in the system resource data 128 match any of the resource identifier(s) in the resource list(s) associated with the job class of the job. If the result of this determination is positive, the control flows to step 414. If the result of this determination is negative, the control flows to step 412. The job scheduler 110, at step 412, records a resource that matches a resource identifier in the resource list or a resource that does not match a "cannot use" resource list as a usable resource for the job. In one embodiment, the recorded information can be stored in (but not limited to) a hash table or database for fast retrieval. The control then flows to step 414 where the job scheduler 110 determines if there is another resource in the system resource data 128 that has not gone through this selection process. If the result of this determination is negative, the control flow exits at step 416. If the result of this determination is positive, the control flow returns to step 404 where the selection process is performed for the next resource in the system resource data.

EXAMPLE OF AN INFORMATION PROCESSING SYSTEM

Figure 5:
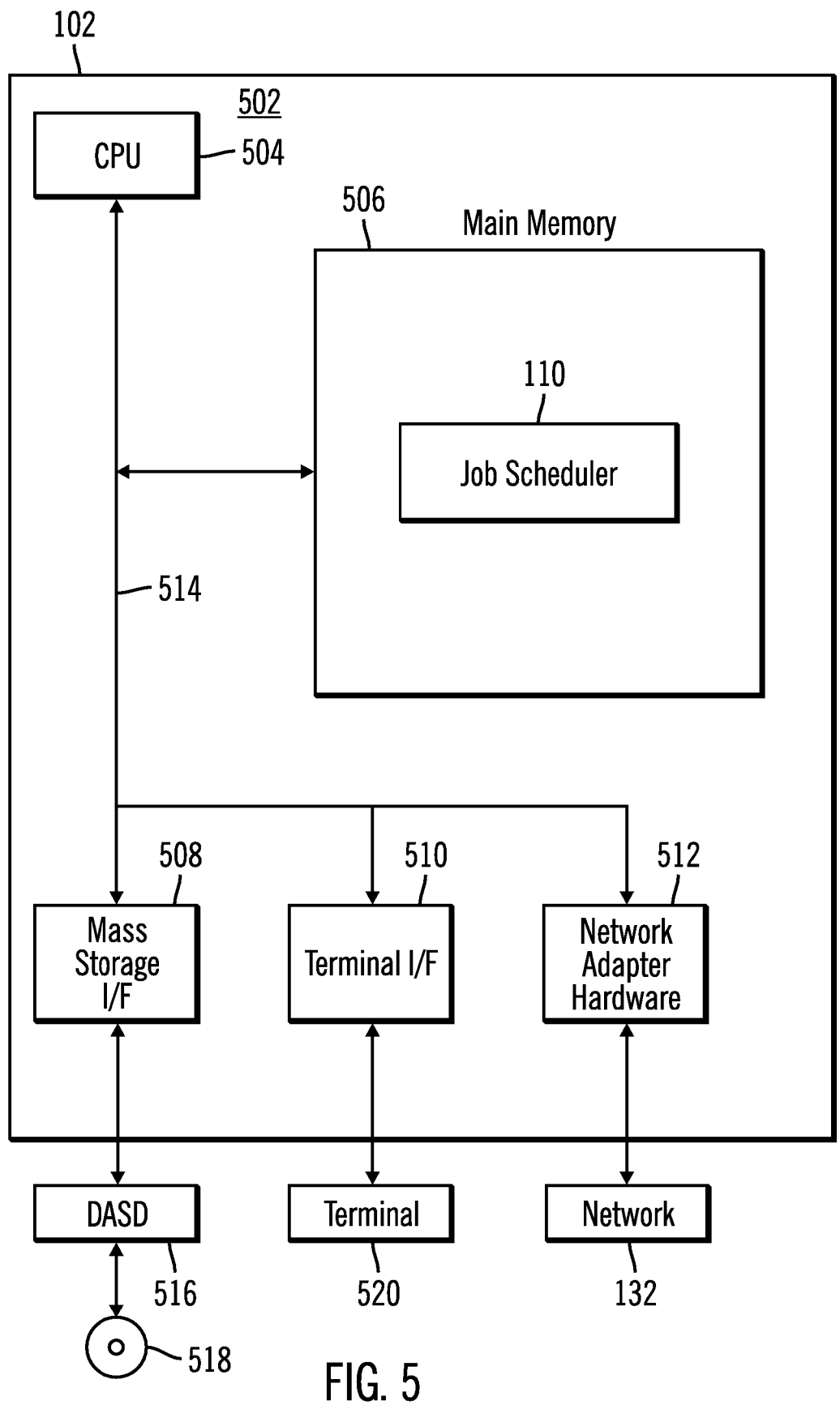
FIG. 5 is a block diagram illustrating a detailed view of an information processing system according to one embodiment of the present invention.

FIG. 5 is a block diagram illustrating a more detailed view of an information processing system 102 according to one embodiment of the present invention. The information processing system 102 is based upon a suitably configured processing system adapted to implement one embodiment of the present invention, according to the present example. Any suitably configured processing system is similarly able to be used as the information processing system 102 by various embodiments of the present invention such as an information processing system residing in the computing environment of FIG. 1, a personal computer, a workstation, or the like.

The information processing system 102 includes a computer 502. The computer 502 has a processor 504 that is connected to a main memory 506, mass storage interface 508, terminal interface 510, and network adapter hardware 512. A system bus 514 interconnects these system components. The mass storage interface 508 is used to connect mass storage devices, such as data storage device 516, to the information processing system 102. One specific type of data storage device is a computer readable medium such as a floppy disk drive, which may be used to store data to and read data from a CD 518 or a floppy diskette (not shown). Another type of data storage device is a data storage device configured to support, for example, NTFS type file system operations.

The main memory 506, in one embodiment, includes the job scheduler 110 and its components discussed above with respect to FIGS. 1-4. Although illustrated as concurrently resident in the main memory 506, it is clear that respective components of the main memory 506 are not required to be completely resident in the main memory 506 at all times or even at the same time. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 506 and data storage device 516. Note that the term "computer system memory" is used herein to generically refer to the entire virtual memory of the information processing system 102.

Although only one CPU 504 is illustrated for computer 502, computer systems with multiple CPUs can be used equally effectively. Various embodiments of the present invention further incorporate interfaces that each includes separate, fully programmed microprocessors that are used to off-load processing from the CPU 504. Terminal interface 510 is used to directly connect one or more terminals 520 to computer 502 to provide a user interface to the computer 502. These terminals 520, which are able to be non-intelligent or fully programmable workstations, are used to allow system administrators and users to communicate with the information processing system 102. The terminal 520 is also able to consist of user interface and peripheral devices that are connected to computer 502 and controlled by terminal interface hardware included in the terminal I/F 510 that includes video adapters and interfaces for keyboards, pointing devices, and other devices/interfaces.

An operating system (not shown) included in the main memory is a suitable multitasking operating system such as the Linux, UNIX, Windows XP, and Windows Server 2001 operating system. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 102. The network adapter hardware 512 is used to provide an interface to a network 132. Various embodiments of the present invention can be adapted to work with any data communications connections including present day analog and/or digital techniques or via a future networking mechanism.

Although the embodiments of the present invention are described in the context of a fully functional computer system, those skilled in the art will appreciate that various embodiments are capable of being distributed as a program product via CD or DVD, e.g. CD 518, CD ROM, or other form of recordable media, or via any type of electronic transmission mechanism.

NON-LIMITING EXAMPLES

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer implemented method for associating jobs with resource subsets in a job scheduler, the method comprising:

receiving, by a processor, at least one job class information set associated with a job class that defines characteristics associated with a type of job, wherein at least one job is associated with the job class;

receiving a list of resource identifiers identifying a subset of resources, within a plurality of resources, associated with the job class, wherein each resource in the subset of resources is usable by each job associated with the job class, wherein the list of resource identifiers is separate and distinct from the job class information set and is independent of jobs associated with the job class information, and wherein the list of resource identifiers comprises at least one of:

an entire name associated with a resource, a portion of a name associated with a resource, and a pattern associated with a set of resources;

receiving a set of resources available on at least one information processing system;

comparing the resource identifiers with each resource in the set of resources available on the information processing system, wherein the comparing further comprises at least one of:

matching at least a portion of a resource identifier to a resource in the set of resources available on the information processing system;

matching an entire resource identifier to a resource in the set of resources available on the information processing system; and matching a resource identifier to a resource in the set of resources available on the information processing system using wild cards;

identifying, based on the comparing, at least one resource in the set of resources available on the information processing system that matches a resource identifier in the list of resource identifiers; and scheduling a job associated with the job class with the at least one resource that has been identified.

2. The method of claim 1, wherein the list of resource identifiers identifies a set of resources that jobs associated with the job class are prevented from using.

3. The method of claim 1, wherein the list of resource identifiers identifies a set of resources that the job class can use.

4. The method of claim 1, further comprising:
selecting the at least one resource to be used by the job associated with the job class.

5. The method of claim 1, further comprising:
selecting, in response to the at least one resource matching a resource identifier in the list of resource identifiers, all remaining resources in the set of resources available on the information processing system to be used by the job associated with the job class.

6. An information processing system for associating jobs with resource subsets in a job scheduler, the information processing system comprising:
a memory;
a processor;
a job scheduler communicatively coupled to the memory and the processor, wherein the job scheduler is configured to:
receive at least one job class information set associated with a job class that defines characteristics associated with a type of job, wherein at least one job is associated with the job class;
receive a list of resource identifiers identifying a subset of resources, within a plurality of resources, associated with the job class,
wherein each resource in the subset of resources is usable by each job associated with the job class,
wherein the list of resource identifiers is separate and distinct from the job class information set and is independent of jobs associated with the job class information, and
wherein the list of resource identifiers comprises at least one of:
an entire name associated with a resource,
a portion of a name associated with a resource, and
a pattern associated with a set of resources;
receive a set of resources available on at least one information processing system;
compare the resource identifiers with each resource in the set of resources available on the information processing system, wherein the comparing further comprises at least one of:
matching at least a portion of a resource identifier to a resource in the set of resources available on the information processing system;
matching an entire resource identifier to a resource in the set of resources available on the information processing system; and
matching a resource identifier to a resource in the set of resources available on the information processing system using wild cards;
identify, based on comparing the resource identifiers with each resource in the set of resources available on the information processing system, at least one resource in the set of resources available on the information processing system that matches a resource identifier in the list of resource identifiers; and
schedule a job associated with the job class with the at least one resource that has been identified.

7. The information processing system of claim 6, wherein the list of resource identifiers identifies at least one of:
a set of resources that jobs associated with the job class are prevented from using; and
a set of resources that the job class can use.

8. The information processing system of claim 6, wherein the job scheduler is further configured to:
select the at least one resource to be used by the job associated with the job class.

9. The information processing system of claim 6, wherein the job scheduler is further configured to:
select, in response to the at least one resource matching a resource identifier in the list of resource identifiers, all remaining resources in the set of resources available on the information processing system to be used by the job associated with the job class.

10. A non-transitory computer program storage product for associating jobs with resource subsets in a job scheduler, the computer program storage product comprising instructions for performing a method comprising:
receiving at least one job class information set associated with a job class that defines characteristics associated with a type of job, wherein at least one job is associated with the job class;
receiving a list of resource identifiers identifying a subset of resources, within a plurality of resources, associated with the job class,
wherein each resource in the subset of resources is usable by each job associated with the job class,
wherein the list of resource identifiers is separate and distinct from the job class information set and is independent of jobs associated with the job class information, and
wherein the list of resource identifiers comprises at least one of:
an entire name associated with a resource,
a portion of a name associated with a resource, and
a pattern associated with a set of resources;
receiving a set of resources available on at least one information processing system;
comparing the resource identifiers with each resource in the set of resources available on the information processing system, wherein the comparing further comprises at least one of:
matching at least a portion of a resource identifier to a resource in the set of resources available on the information processing system;
matching an entire resource identifier to a resource in the set of resources available on the information processing system; and
matching a resource identifier to a resource in the set of resources available on the information processing system using wild cards;
identifying, based on the comparing, at least one resource in the set of resources available on the information processing system that matches a resource identifier in the list of resource identifiers; and scheduling a job associated with the job class with the at least one resource that has been identified.

11. The non-transitory computer program storage product of claim 10, wherein the list of resource identifiers identifies a set of resources that jobs associated with the job class are prevented from using.

12. The non-transitory computer program storage product of claim 10, wherein the list of resource identifiers identifies a set of resources that the job class can use.

13. The non-transitory computer program storage product of claim 10, wherein method further comprises:

selecting the at least one resource to be used by the job associated with the job class.

14. The non-transitory computer program storage product of claim 10, wherein the method further comprises:

selecting, in response to the at least one resource matching a resource identifier in the list of resource identifiers, all remaining resources in the set of resources available on the information processing system to be used by the job associated with the job class.

\* \* \* \* \*